United States Patent [19]

Breher

[11] Patent Number: 4,515,743

[45] Date of Patent: May 7, 1985

[54] METHOD OF PRODUCING A REINFORCED TOOTHED BELT HAVING A FABRIC COVER

[75] Inventor: Rudolf Breher, Porta Westfalica, Fed. Rep. of Germany

[73] Assignee: BRECO Kunststoffverarbeitungs-GmbH & Co. KG, Porta Westfalica, Fed. Rep. of Germany

[21] Appl. No.: 450,637

[22] Filed: Dec. 17, 1982

[30] Foreign Application Priority Data

Jan. 4, 1982 [DE] Fed. Rep. of Germany ....... 3200063

[51] Int. Cl.³ .......................... B29C 5/00; B29H 3/08; B29H 3/10
[52] U.S. Cl. .................................. 264/135; 156/140; 264/136; 264/257
[58] Field of Search ............................ 264/134–136, 264/226, 257, 258; 156/13

[56] References Cited

U.S. PATENT DOCUMENTS

| | | | |
|---|---|---|---|
| 3,436,447 | 4/1969 | Meitinger | 264/135 |
| 3,441,641 | 4/1969 | Roberts | 264/267 |
| 3,880,558 | 4/1975 | Breher et al. | 425/115 |
| 3,956,056 | 5/1976 | Boguslawski et al. | 425/113 |
| 3,981,206 | 9/1976 | Miranti et al. | 474/260 |
| 3,999,914 | 12/1976 | Breher et al. | 425/125 |
| 4,053,547 | 10/1977 | Redmond | 264/135 |
| 4,058,424 | 11/1977 | Breher | 425/115 |

FOREIGN PATENT DOCUMENTS 2065016  6/1981  United Kingdom ................ 264/257

Primary Examiner—Willard E. Hoag
Attorney, Agent, or Firm—Becker & Becker, Inc

[57] ABSTRACT

A method of producing a reinforced plastics toothed belt having a fabric cover on the toothed side of the belt. Formed between a molding wheel and a molding wheel cover is a mold cavity into which the liquid plastics material, the reinforcing wires, and the strip of fabric are introduced. The strip of fabric, which is resiliently extensible in its longitudinal direction, is wetted, in the unextended state, before being introduced into the mold cavity, with an adhesive agent which hardens by drying and softens again under the temperature of the liquid plastics material. After the drying of the adhesive agent, the strip of fabric is introduced into the mold cavity and is placed on the teeth of the molding wheel. In the mold cavity, the strip of fabric is heated on meeting the liquid plastics material, is made resiliently extensible again as the adhesive agent softens, and is pressed into the grooves between the teeth of the molding wheel by the plastics material.

3 Claims, 2 Drawing Figures

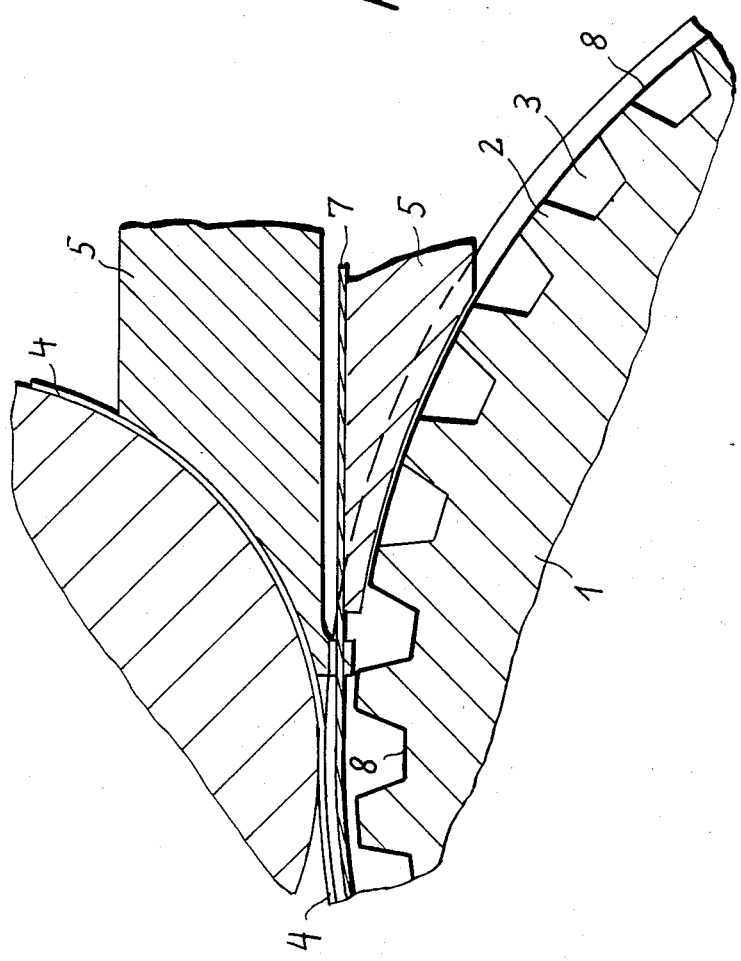

METHOD OF PRODUCING A REINFORCED TOOTHED BELT HAVING A FABRIC COVER

BACKGROUND OF THE INVENTION

1. Field of the Invention

The present invention relates to a method of producing a toothed belt of plastics material or similar extrudable material, with a reinforcing insert in the form of wire or thread extending in the longitudinal direction of the belt, and with a fabric cover which covers the toothed side of the belt; a mold cavity is formed between a molding wheel which can be driven continuously and which is provided on its periphery with an annular depression which is profiled in the manner of a gear wheel and and which corresponds in cross section to the cross section of the belt which is to be produced, and a cover which closes the depression over a portion of the periphery of the molding wheel; and the plasticized plastics material is introduced into the beginning of the mold cavity through a nozzle which can be used for the sealed introduction of the reinforcing insert and/or the fabric cover.

2. Description of the Prior Art

According to German Pat. No. 28 01 604 and corresponding U.S. Pat. No. 4,251,306-Breher dated Feb. 17, 1981 liquid plastics material and a strip of fabric are introduced into the mold cavity in order to obtain a finite strand of toothed belt which is covered with the strip of fabric on its toothed side, from which strand a wide piece of flexible tube is subsequently formed by winding and embedding a subsequently applied reinforcing insert, from which piece of flexible tube endless toothed belts of any belt width can be cut off.

According to German Pat. No. 21 23 902, and corresponding U.S. Pat. Nos. 3,880,558—Breher et al. dated Apr. 29, 1975 and 3,999,914—Breher et al. dated Dec. 26, 1976 as a divisional thereof liquid plastics material and a reinforcing insert are introduced into the mold cavity in order to obtain a reinforced finite strand of toothed belt which can be closed to form an endless reinforced toothed belt of any length of belt circumference by suitable connection of the ends of the belt strand. In principle, it is possible to also introduce a strip of fabric into the mold cavity in order to obtain a reinforced finite strand of toothed belt which is covered on its toothed side with the strip of fabric.

During the production of both of the aforementioned known toothed belts, the strip of fabric must be resiliently extensible in its longitudinal direction in order that the strip of fabric in the mold cavity, where it at first covers the grooves between the teeth in the molding wheel depression in a hollow manner, can be pressed into the grooves between the teeth in the molding wheel depression by the plastics material, which is introduced under pressure. During the introduction of the strip of fabric into the mold cavity, the problem has arisen that the soft and stretchably extensible fabric cannot be guided satisfactorily laterally, so as to run straight and flat into the mold cavity. There is the risk that the strip of fabric may shift sideways, may compress at one side of the mold cavity, or may fold over, so that no toothed belt satisfactorily covered with fabric on its toothed side is produced.

It is an object of the present invention to provide a method of the aforementioned general type which overcomes the described problems.

BRIEF DESCRIPTION OF THE DRAWINGS

This object, and other objects and advantages of the present invention, will appear more clearly from the following specification in connection with the accompanying drawings, in which:

FIG. 2 shows a detail from FIG. 1 on a larger scale.

SUMMARY OF THE INVENTION

Figure 1:
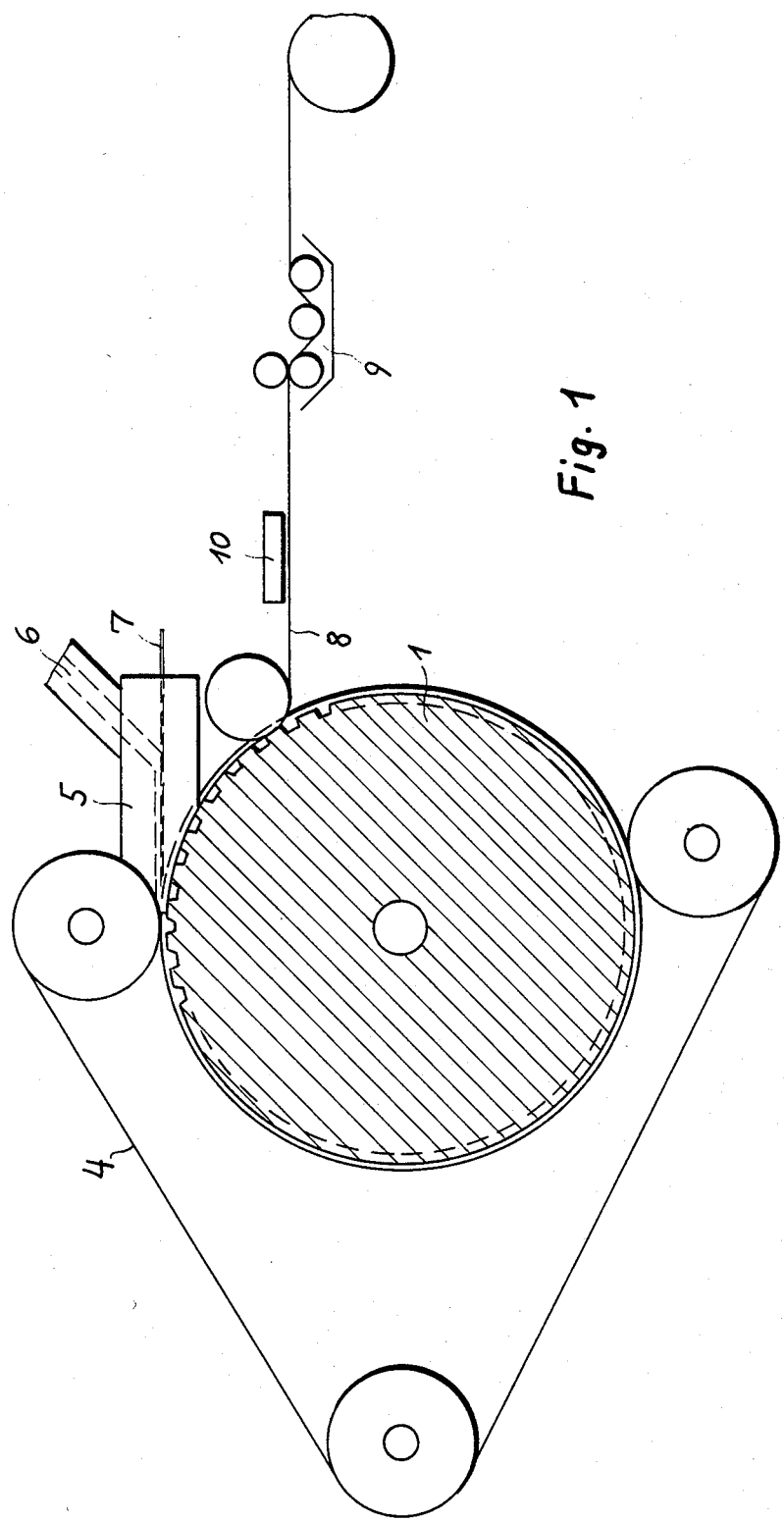
FIG. 1 is a diagrammatic illustration of one embodiment of an apparatus for carrying out the inventive method.

The method of the present invention is characterized primarily in that a strip of fabric, which is resiliently extensible in its longitudinal direction, is wetted, in the substantially unextended state, with a liquid adhesive agent which enters into an adhesive connection with the plastics material and which hardens through drying and softens again at the plasticizing temperature used for the introduction of the plastics material; and in that, after the drying of the applied adhesive agent, the strip of fabric is introduced into the mold cavity, is placed on the teeth of the molding wheel depression, is then made resiliently extensible by meeting the plastics material which enters through the nozzle and heats and again softens the adhesive agent, and is pressed into the grooves between the teeth in the molding wheel depression.

As a result of the dried adhesive agent, the strip of fabric becomes so stiff that it is guided satisfactorily laterally, in a straight line and lying flat, and can be introduced into the mold cavity. Only in the mold cavity is the stiffness counteracted again by the process temperature acting thereon, so that the strip of fabric is resiliently extensible, as before the application of the adhesive agent, and can be pressed down completely into the grooves between the teeth of the molding wheel depression by the plastics material.

A further advantage of wetting the strip of fabric with the adhesive agent consists in that the strip of fabric is protected from fraying at the edges of the fabric on the finished toothed belt, and that a web of fabric of standard commercial width can be provided with the adhesive agent, for example by immersion impregnation and subsequent drying, and after that, because of its stiffness, can be cut very easily into strips of fabric having a width precisely fitting the width of the mold cavity, with straight cut edges which are protected against fraying. As an adhesive agent for wetting the strip of fabric, the same liquid adhesive agent may be used, for example, as is generally used for wetting the surface of reinforcing inserts of metal wire in order to increase their adhesive connection to the plastics material.

DESCRIPTION OF THE PREFERRED EMBODIMENT

Referring now to the drawings in detail, the apparatus comprises a rotatable molding wheel 1 which is provided on its periphery with an annular depression, the cross section of which corresponds to the cross section of the belt to be produced, and which is profiled in the manner of a gear wheel with teeth 2 and grooves 3 between the teeth. In order to form a mold cavity, the molding wheel depression is closed over a portion of the molding wheel periphery by a cover 4 which consists of an endless rotating molding belt, and which cooperates, in a sealing manner, with the molding wheel circumference with radical spacing from the molding wheel teeth 2 at each side of the molding wheel depression. The beginning of the mold cavity is closed, in a sealing manner, by a nozzle 5 which includes a runner or injection channel 6 for the liquid plastics material to be introduced, and through which a reinforcing insert 7 in the form of wire is introduced, in a sealed manner, into the mold cavity. The underside of the nozzle 5, together with the molding wheel teeth 2, forms a gap through which a strip of fabric 8 is introduced into the mold cavity. Before being introduced into the mold cavity, the strip of fabric 8 is wetted with a liquid adhesive agent in an immersion bath 9, and is then dried by means of a drying device 10. After the drying and hardening of the adhesive agent, the strip of fabric 8 is so stiff that it is guided laterally precisely in a straight line and lying flat, and is placed on the molding wheel teeth 2 before the entry point of the plastics material and can be introduced into the mold cavity. At first the grooves 3 between the molding wheel teeth are covered in a hollow manner by the stiff strip of fabric 8. As soon as the strip of fabric 8 meets the liquid plastics material which is introduced, at the periphery of the mold cavity, the adhesive agent becomes soft under the effect of heat and the strip of fabric 8 also becomes soft again and resiliently extensible in the longitudinal direction, so that the plastics material, which is introduced under pressure, can press the strip of fabric 8 down into the grooves 3 between the molding wheel teeth 2 for the complete forming out of these grooves 3.

In order to increase the adhesive connection, for example of metal wires as reinforcing inserts to the plastics materials which is customary for toothed belts, liquid adhesive agents are known and usual, and are applied to the surface of the wire, for example by an immersion process, and are hardened by drying and can be made soft again under the effect of the processing temperature of the plastics material. Such adhesive agents can also be used for the method according to the invention for wetting and stiffening the resiliently extensible strip of fabric.

The present invention is, of course, in no way restricted to the specific disclosure of the specification and drawings, but also encompasses any modifications within the scope of the appended claims.

What I claim is:

1. A method of producing a toothed belt of extrudable material having a tension-proof reinforcing insert relative to which a strip of extensible fabric in a substantially unextended state is also introduced continuously into a mold hollow chamber beginning, such fabric strip being placed upon teeth of a mold wheel depression so that the fabric strip in the hollow mold chamber is pressed into the mold wheel by plasticized synthetic material whereby the fabric strip is pressed into tooth grooves of the mold wheel depression, said belt having a fabric cover on the toothed side of said belt, and a reinforcing insert which extends in the longitudinal direction of said belt and which serves for tension-proof stiffening of the toothed belt synthetic material; said method in combination comprising the steps of:

providing a molding wheel which can be driven continuously and which, on its periphery, is provided with an annular depression which, in the manner of a gear wheel, includes alternating teeth and grooves, and which corresponds in cross section to the cross section of said belt which is to be produced;

providing a cover which closes said annular depression over a portion of the periphery of said molding wheel;

forming a mold cavity between said molding wheel and said cover;

continuously introducing said extrudable material, at a plasticizing temperature, into the beginning of said mold cavity;

wetting, in its substantially unextended state, the strip of extensible fabric, which however during said wetting also is resiliently extensible in its longitudinal direction, by applying thereto a liquid adhesive agent which is adapted to enter into an adhesive connection with said extrudable material and which adhesive agent hardens and stiffens the strip of fabric by being dried and which together therewith softens again at said plasticizing temperature used for said introduction of said extrudable material;

drying and thus hardening said strip of fabric with said adhesive agent applied thereto;

then after said hardening thereof placing said strip of fabric onto said teeth ahead of said introduction of said extrudable material warmed at said plasticizing temperature into said mold cavity;

thereupon making said strip of fabric, as it rests on said teeth, resiliently extensible, accompanied by heating thereof and accompanied by purposeful resoftening of said adhesive agent, by encountering warmth of plasticizing temperature of said extrudable material as it enters said mold cavity;

subsequent to said resoftening thereupon pressing said resiliently extensible strip of fabric into said grooves to form said fabric cover specifically on only the alternating teeth and grooves on the toothed side of said belt; and finally introducing said reinforcing insert into said mold cavity between said cover and said strip of fabric.

2. A method in combination according to claim 1, which includes the step of providing a nozzle for effecting said introduction of said extrudable material into said mold cavity.

3. A method in combination according to claim 2, which includes the step of also using said nozzle to effect sealed introduction into said mold cavity of at least one of said reinforcing insert and said strip of fabric.

* * * * *